May 29, 1934. J. L. ANDERSON 1,960,524
TUBE WELDING MACHINE
Filed April 15, 1932   3 Sheets-Sheet 1

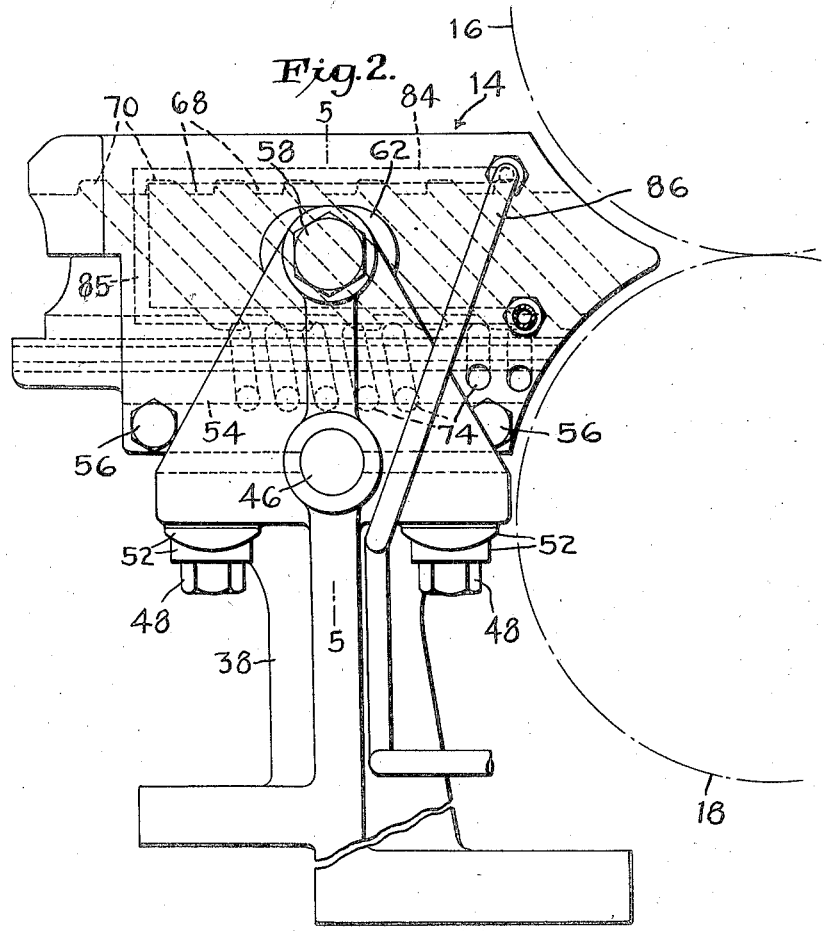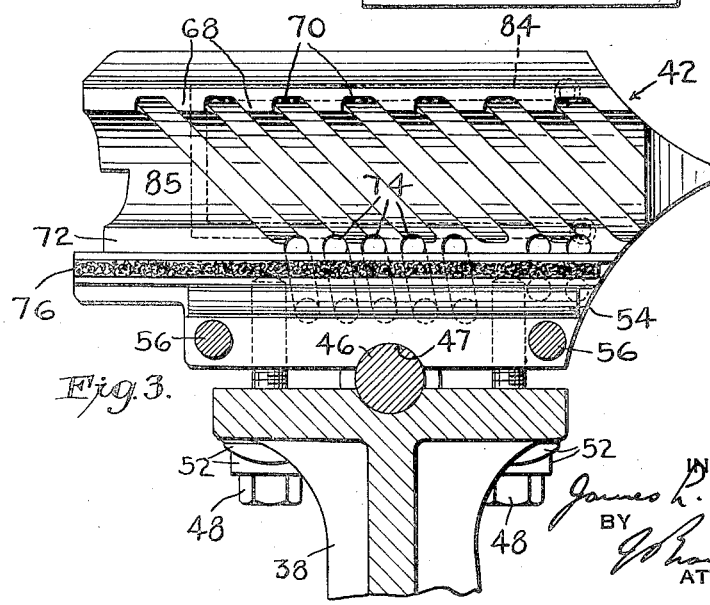

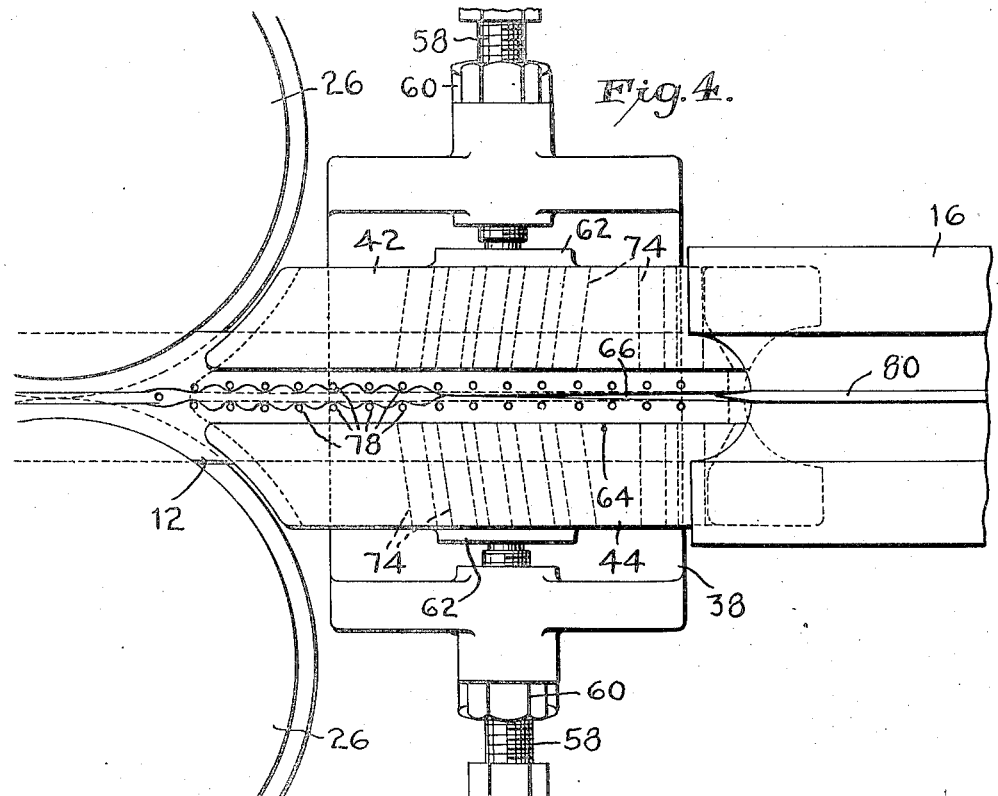
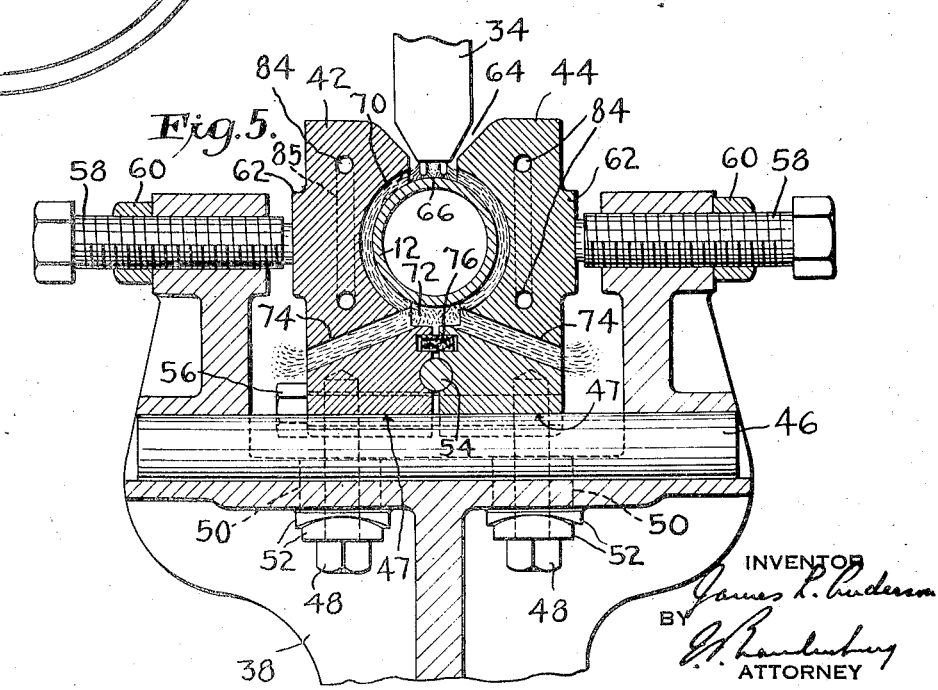

Patented May 29, 1934

1,960,524

UNITED STATES PATENT OFFICE 1,960,524

TUBE WELDING MACHINE

James L. Anderson, Tenafly, N. J., assignor to Air Reduction Company, Incorporated, New York, N. Y., a corporation of New York Application April 15, 1932, Serial No. 605,453

23 Claims. (Cl. 113—59)

This invention relates to tube welding apparatus, and particularly to guide and/or heating means through which the tube passes during the welding process.

Objects of the invention are to increase the speed at which tube welding can be successfully performed, to reduce the amount of fuel required to make the weld, and to make a better and stronger welded product. The invention relates more especially to the production of butt-welded pipe and tubing.

When welding tubes by the flame method, as in oxyacetylene welding, considerable heat is contained in the envelope gases which surround the welding flame. If these gases are used to preheat the tube, in accordance with my invention less heat is required from the welding flame to bring the tube edges to fusion, and/or the tube can be passed under the flame at higher speed. By preheating the tube it is possible to avoid overheating or burning of the metal, such as often occurs when an excessive amount of welding torch heat is used to fuse the metal rapidly and obtain fast welding speed.

The use of the envelope gases to heat the tube reduces the conduction losses, and consequently reduces the amount of gas necessary to make the weld. By conducting these gases into an enclosure which guides them substantially entirely around the tube and out through a discharge conduit, the whole body of the tube is heated to relatively high temperature and the operator of the welding apparatus can watch the progress of the work more easily, since his vision is not blocked by the envelope gases which ordinarily flare upwardly from the weld.

Another object of the invention is to provide an improved device for holding the unwelded tubular shape from spreading wide open as the result of the release of strains in the metal under the heat of the flame, and to preserve a proper narrow spacing between the edges as they approach the welding zone.

A further object of the invention is to provide a guide for tube welding apparatus, which will shape the tube and thereby relieve the welding and sizing rolls of a part of the shaping work, and to provide such a guide with adjustments for regulating the size of the tube passed through the guide.

A more particular object of the invention is to provide a tube guide having a flame-receiving slot along the tube seam, the guide being divided into two halves on the plane of the flame-receiving slot and the two halves pivotally joined at the side opposite the flame-receiving slot.

A further object of the invention is to provide a tube guide which utilizes as much as possible of the heat of gases which would otherwise be wasted and troublesome. To this end the guide is provided with internal grooves and channels in a manner that will be described.

A further object is to provide a tube guide with a mounting which permits universal adjustment of the guide in obtaining proper alinement of the tube.

Other objects and advantages of the invention will appear or be pointed out as the description proceeds.

In the accompanying drawings, forming part hereof:

Fig. 2 is a side elevation of the tube guide shown in Fig. 1;

Fig. 3 is a sectional view of the tube guide shown in Fig. 2;

Fig. 4 is a top plan view of the tube guide and adjacent rolls, showing the manner in which the tube passes through the guide and rolls during the operation of the welding apparatus; and Fig. 5 is a section on the line 5—5 of Fig. 2, the section being taken along the line of the ribs to show more clearly the path of the hot gases.

Figure 1:
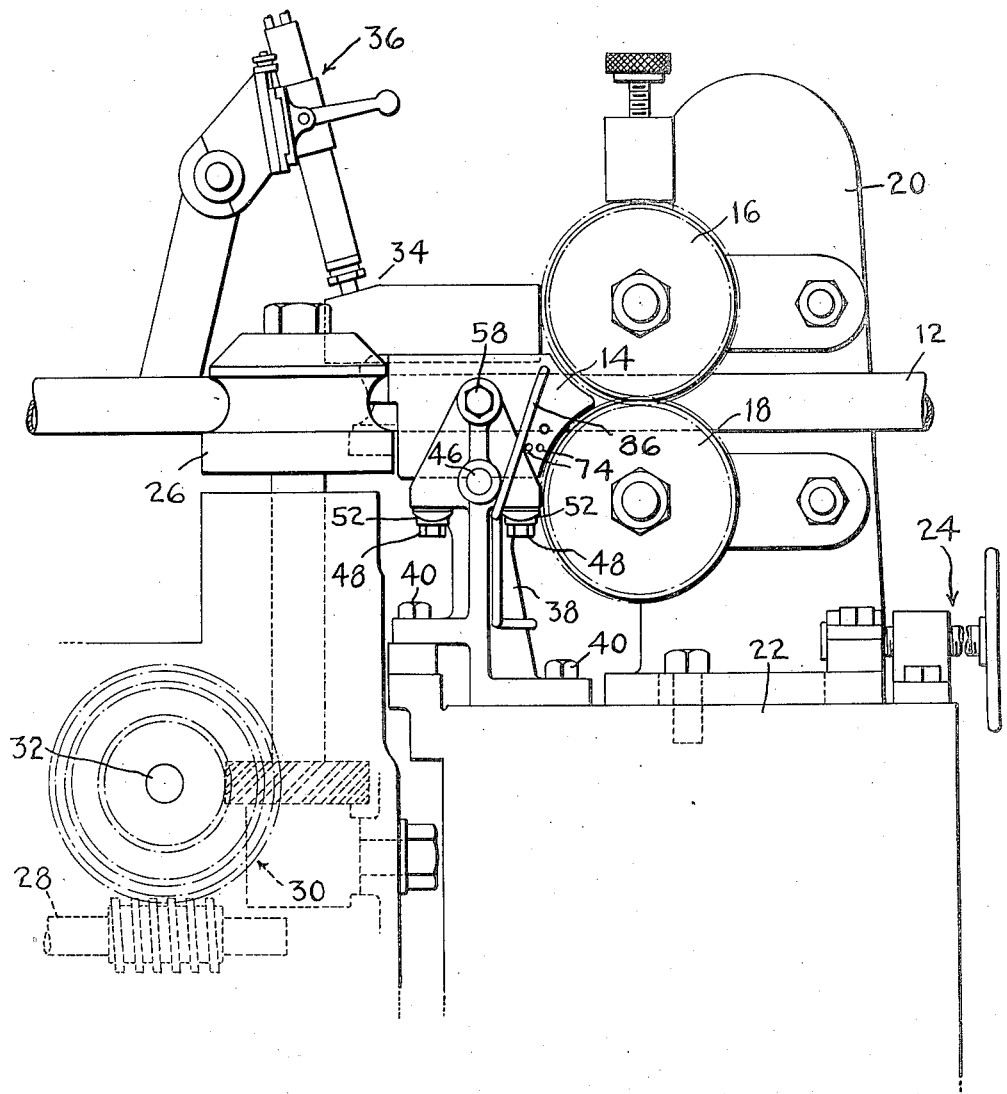
Fig. 1 is a fragmentary diagrammatical side elevation of a tube welding machine, to which the invention is applied.

The invention is designed primarily for use with a tube welding apparatus of the type shown in Fig. 1, in which a tube 12 is fed through a guide 14 by feed rolls 16, 18. These feed rolls are rotated by power mechanism, not shown, and are rotatably supported on a frame 20. The frame 20 is mounted on a main frame 22, on which it is adjustable to the right or left, in Fig. 1, by a manually operated screw adjustment 24. The tube passes from the guide 14, through rolls 26, commonly called welding rolls because of their proximity to the weld. These welding rolls are rotated by a power shaft 28, which transmits power through reduction gearing 30 to a shaft 32, which is geared to the shafts of the welding rolls 26. A torch 34 is carried by a conventional supporting bracket 36.

The enclosure or guide 14 is carried by a guide support 38, which is detachably secured to the main frame by screws 40.

Referring to Figs. 3 and 5, the guide comprises a pair of mating block members 42 and 44. Both of these block members are provided with a transverse arcuate recess having a face 47 contacting with a shaft 46, as shown in Fig. 3. The shaft 46 is held by the guide support 38, as shown in Fig. 5.

Referring again to Fig. 3, the faces 47 serve as a bearing on which the block members have pivotal movement about the axis of the shaft 46. This pivotal movement is limited, since the block members will strike the guide support 38 after a certain angular movement about the shaft 46. The screws 48 normally hold the block members against pivotal movement on the shaft 46, but when the operation of the machine is first started the screws 48 may be backed off, so that the guide is free to aline itself with the tube as it passes from the feed rolls to the welding rolls, after which the adjustment is set. The guide may also be adjusted angularly by means of the screws 48, so as to control a bowing of the tube such as described in my Patent No. 1,520,271, dated December 23, 1924.

The screws 48 fit loosely through holes 50 in the guide support 38, and thread into the block members 42 and 44. There are two screws 48 threading into each of the block members. A pair of special washers 52, having engaging surfaces of ball and socket formation, are located between the head of each screw 48 and the surface of the guide support 38, so that the screws 48 will have a firm clamping action on the guide support when the axes of the screws are not at right angles to the surface of the guide support. The block members 42 and 44 can, therefore, be rocked into any position about the shaft 46 within the limits imposed by the block members striking the support 38, and the block members can be held in such adjusted position by turning the screws 48 and clamping the washers 52 against the guide support 38.

Each of the block members 42 and 44 has an arcuate groove, which fits a shaft 54, this shaft being of somewhat larger diameter than the combined depth of the arcuate grooves in which it is mounted, as shown in Fig. 5.

Screws 56 fit freely in the guide block 42 and thread into the guide block 44 to clamp the guide blocks into contact with the shaft 54.

An adjusting screw 58 is threaded through each side of the guide support 38, and these adjusting screws are locked in position by lock nuts 60. The ends of these adjusting screws engage with bosses 62 on the sides of the block members 42 and 44.

The opposing faces of the block members are recessed to provide openings through which the tube 12 passes, and the upper ends of the block members are spaced apart to provide a slot 64, which extends along the seam 66 of the tube 12. By turning the adjusting screws 58 in one direction, the block members 42 and 44 may be rocked about the shaft 54 to bring the upper portions of the block member closer together and compress the tube, so that the edges of the seam move nearer together or contact with one another. By turning the adjusting screws 58 in the other direction, the tube is left free to expand the guide, and the edges of the tube will spring apart. The tendency of the tube to expand, and of the edges of the seam to separate, depends largely on the material of which the tube is made, some kinds of material having different elastic properties than others. Unless the tube is restrained when the heat is applied, internal stresses are often released and the seam spreads apart, making a successful weld impossible. The adjustment of the block members will be more fully explained in the description of Fig. 4.

Referring to Fig. 3, the walls of the tube guide have parallel ribs 68. The faces of these ribs are the bearing surfaces for the tube when passing through the guide, and the grooves 70 between the ribs provide passages through which hot gases flow around the tube. In Fig. 3 the ribs and grooves slope downwardly toward the right. A tube passing through this guide is moved toward the left. The hot gases flowing through the grooves will, therefore, move along the tube in a direction opposite to the movement of the tube and effect a preheating of the tube as it moves toward the source of welding heat.

The ribs 68 terminate at their lower ends in a longitudinal groove 72 (Fig. 5), which extends along the lower side of the tube 12. Each of the block members has a set of openings 74 from the longitudinal groove through the sides of the guide. Fig. 5 illustrates the flow of hot envelope gases from the welding flame in the slot 64, around the tube 12, and out through the openings 74. The invention is particularly designed for use with flame welding, but is of use also in arc welding, in which hot gases are generated around the arc.

With an oxyacetylene torch, such as is illustrated, the intense heat that actually brings the seam edges to fusion and fuses them comes from the cone of the flame. The envelope gases are not only hot as they issue from the cone but are themselves combustible. It will be observed that the burner of the torch extends into the slotted flame entrance 64 of the heater or guide, the sides of which are preferably convergent as shown, and that air can enter between the adjacent sides of the slot and the burner, so that not only are the products of partial combustion trapped and caused to flow around the tube but also air is drawn in to burn them.

A longitudinal strip of asbestos 76, or other suitable material, protects the shaft 54 and its bearing surfaces against the hot gases or flames in the groove 72.

In Fig. 4 the torch is not shown, but a double row of flame jets is shown by the indications 78.

A seam guide fin 80 on one of the rolls 16 determines the width of the seam cleft as the tube leaves the rolls 16 and 18. The block members 42 and 44 are adjusted so that the opening for the tube through the guide is slightly tapered. This taper causes the edges of the tube to move closer together as the tube passes through the guide. The first flame jets which the tube encounters add heat to the metal, and the hot gases which are guided forward from the other flame jets assist in heating the tube. The application of heat to the entire circumference of the tube, by means of the hot gases, reduces the conduction losses from the metal at the seam edges, and the temperature of the seam edges can, therefore, be raised more quickly or with the use of less gases supplied to the torch.

The metal of the tube fuses, and the elongated puddle of metal is indicated by the wavy seam lines in Fig. 4. During the preheating and welding operations the tube is held in the guide with the seam edges properly spaced. The guide may be adjusted in the manner already described to obtain the type of seam weld desired.

The tube passes from the guide to the welding rolls 26, which hold the tube while the fused metal is solidifying. The ends of the guide are shaped to fit into the cusp-shaped space between the rolls 16 and 18 (Fig. 2), and also between the welding rolls 26 (Fig. 4). Thus, the effective length of the tube guide is as long as possible within the space between the rolls, and the tube is guided and the edges held in proper spaced relation from the time the tube leaves the rolls 16 and 18 until it enters the rolls 26. I have found that by properly adjusting the block members of my improved guide the tube will be delivered to the welding rolls substantially sized, and the sizing function of the welding and sizing rolls is much more easily performed.

When used with tubes having little or no tendency to spread when heated, the guide may be adjusted so that it does not touch the sides of the tube, but guides the hot gases around the tube in substantially the same manner as previously described. I prefer to adjust the guide so that it contacts with the walls of tube because such operation gives better control of cleft width and the size of the tube.

Each of the block members 42 and 44 has water passages 84 therein for a cooling medium, such as water. One of these passages extends lengthwise in each block member near the top, the other passage extending lengthwise in the lower portion of the block member and the two being connected by a duct 85 in the forward part of the block member. The water is circulated through these passages, to and from external connections including the valved pipe 86. Cast iron is particularly good material for the guide, since it does not score the tube when hot and operating under considerable friction.

The preferred embodiment of the invention has been illustrated and described, but changes in form and adjustments may be made without departing from the spirit of the invention as set forth in the appended claims.

I claim:

1. In a tube welding apparatus and in combination with a stationary welder and means for passing the tubularly formed material in uninterrupted motion, a stationary guide having an opening therein through which a tube passes and having a slot therein along the seam of the tube, the walls of the opening being formed with grooves extending from the slot and around the greater part of the circumference of the tube to conduct hot gases from the region of the slot around the outside surface of the tube.

2. In a welding apparatus, a tube guide having an opening therethrough for the passage of a tube and a slot extending through one region of the guide to provide an entrance for a welding flame, ribs within the opening for bearing against the surface of the tube, said ribs terminating at the slot, so that the grooves between the ribs provide passages for the flow of gases from the slot around the surface of the tube, the guide having a discharge conduit for the hot gases, said discharge conduit being located remote from the slot so that the hot gases pass around the major part of the circumference of the tube before entering the discharge conduit.

3. Tube welding apparatus including a guide with an opening therethrough, feed mechanism for moving the tube through the guide, a flame welding device located adjacent the guide and having access to the tube through a slot in the guide, ribs on the inside surface of the guide for bearing against the tube, said ribs extending from the slot around substantially the entire circumference of the tube and terminating in a discharge conduit, said ribs extending angularly around the tube so that the grooves between the ribs will guide the hot gases from the welding flame around the tube and along the tube in the opposite direction to that in which the feed mechanism moves the tube, thereby preheating the tube before it reaches the welding flame.

4. An article of manufacture comprising a welding apparatus tube guide with an opening for the passage of a tube, and a slot in the top wall through which a source of welding heat can have access to the tube, the guide having grooves extending from the slot around the major part of the circumference of the tube so that hot gases from the region of the weld will pass along the grooves and around the surface of the tube, and openings extending from the grooves through the sides of the guide for the escape of hot gases passing through the grooves.

5. An article of manufacture comprising a welding apparatus tube guide with an opening for the passage of a tube, and a slot through the top of the guide to expose the top of the tube to action of a welding flame, the guide having a recess in the bottom wall of the tube opening, and passages extending from the recess through the sides of the guide, and having grooves extending from the top slot to the recess so that hot envelope gases from the welding flame will pass around the surface of the tube to the recess and then out through the passages in the side of the guide.

6. An apparatus for tube welding including a guide having a passage for the movement of a pipe therethrough, means in the guide for bearing against the surface of the tube to retain the seam edges thereof in welding relation, the guide and bearing means having a slot therethrough along the line where the seam edges pass, said bearing means being formed to guide hot gases from the slot angularly around the tube in the direction of the axis of the tube, said guide being provided with outlet passages for the escape of gases through the walls of the guide from a part of the tube passage substantially opposite the slot.

7. A tube welding apparatus including an oxyfuel torch, rolls for passing a tube longitudinally under the torch, a guide for holding the portion of the tube directly under the torch and the adjacent portions of the tube, the guide having a longitudinal slot in the top thereof through which the flame has access to the seam edges of the tube, parallel spaced-apart ribs within the guide for bearing against the tube, the ribs extending from the slot and around the tube to substantially the bottom of the tube, and extending angularly with respect to the axis of the tube so that hot envelope gases from the welding flame will be guided around the tube and along the surface of the tube in the opposite direction to that in which the tube is moved by the feed rolls, the guide having openings through the side thereof for the escape of gases adjacent the bottom of the tube.

8. In a tube welding apparatus for welding longitudinally extending seams, a guide substantially surrounding the tube and having an opening therethrough for passage of the tube, the guide comprising a pair of mating block members which fit together beneath the tube opening, the block members being formed so that the top edges are spaced apart to provide a slot of much less width than the tube along the top of the guide and extending lengthwise along the seam to admit a heating agency to weld the edges of the tube while in the guide.

9. In a welding apparatus, a tube guide with an opening therethrough for passage of a tube, the guide comprising a pair of mating block members having ribbed faces forming the walls of the tube opening, the top edges of the block members being spaced apart to provide a slot in the top of the guide when the block members are in mated relation, each of the block members having passages extending from substantially the bottom of the ribbed face through the sides of the block member, these passages communicating with the spaces between ribs and the ribs extending upwardly and terminating at the slot so that hot gases from the slot will pass through the spaces between the ribs, around the tube, and escape through the passages in the sides of the block members.

10. In a tube welding apparatus for welding longitudinally extending seams, a stationary guide comprising a pair of block members pivoted together and providing an opening above the pivot and parallel thereto for the passage of a tube, the edges of the block members above the tube opening being spaced to provide a slot extending parallel to the pivot and lengthwise along the seam.

11. In a welding apparatus, a guide comprising a pair of block members, a bearing on which said members have rocking movement with respect to one another, said members having opposed grooved faces providing a tube-receiving opening through the guide parallel to the rocking axis, a slot in the guide on the side of the tube opening remote from the bearing, and means for adjusting the positions of the block members about the bearing.

12. In a welding apparatus, a guide comprising a pair of block members, a pivotal bearing between the lower ends of the block members, opposed ribbed faces on the block members forming an opening above the pivotal bearing for the passage of a tube, the upper edges of the block members being spaced apart to provide a slot through the top wall of the opening, the ribs terminating at the slot and extending at an angle to the tube axis to serve as guides for causing hot gases produced in the slot during welding to flow around the tube and longitudinally along the tube to preheat the tube before it reaches the welding region.

13. In a welding apparatus, a guide comprising a pair of block members, a pivotal bearing between the lower ends of the block members, opposed ribbed faces on the block members forming a substantially cylindrical opening for the passage of an open-seam tube, the upper edges of the block members being spaced apart to provide a slot along the cleft of the tube, and adjusting means for moving the block members about their pivotal bearing to change the size of the cylindrical opening and control the width of the cleft between the edges of the tube.

14. In a welding apparatus, a guide comprising a pair of block members, a bearing on which said members have rocking movement with respect to one another, opposing recessed faces on the members providing a tube-receiving opening through the guide parallel to the rocking axis, the members being spaced apart above the recessed faces to provide a slot through which a welding flame has access to the tube, ribs on the recessed faces bearing against the tube and extending from the slot around the tube to guide hot gases from the welding flame across the surface of the tube, and means to prevent the hot gases from contacting with the bearing.

15. A tube welding apparatus including a frame, mechanism for feeding a tube progressively past a source of welding heat, a guide through which the tube passes during the welding process, and a support connecting the guide with the frame, the guide being rockable on the support for proper alinement with the tube as it passes through the feed mechanism.

16. In a tube welding mechanism, in combination, a pair of block members mated to form a guide having an opening therethrough for passage of a tube, a frame, feed mechanism mounted on the frame for moving the tube through the guide, bearing means on which the block members are movable with universal action for proper alinement with the feed mechanism, and a support on the frame for holding the bearing means.

17. In a tube welding mechanism, in combination, a pair of block members mated to form a tube guide having a longitudinal opening therethrough for passage of a tube, a longitudinal bearing on which the block members are pivotally movable, and a transverse bearing on which the block members are also pivotally movable.

18. In a tube welding machine, in combination, a tube guide comprising a pair of block members with a longitudinal pivotal bearing between their lower ends and opposing recessed faces above the bearing to provide a longitudinal passage for a tube, the upper portions of the block members above the passage being spaced apart to form a slot, a transverse bearing on which both of the block members are mounted for transverse sliding movement, adjusting means for regulating the position of the block members about their pivotal bearing and the consequent width of the slot, and clamping means for holding the block members in such position on the transverse bearing.

19. In a tube welding machine, in combination, a tube guide comprising a pair of mating block members having opposing recessed faces which provide an opening through the guide for passage of a tube, the block members being spaced apart at one side of the opening to provide a slot through which a source of welding heat has access to the edges of the tube, means for moving the block members relative to one another to control the size of the opening through the guide and the consequent spacing between the edges of the tube, and a bearing extending substantially at right angles to the direction of the tube opening, the block members being mounted for rocking movement about the axis of said bearing.

20. In a tube welding machine, the combination with a welding torch which applies heating and fusing flames along the seam region of a longitudinally traveling tube, of a stationary heating enclosure through which the tube passes, said enclosure having a seamwise-extending slot entrance into which the torch burner extends, an interior so formed that the hot envelope gases of the torch flame are conducted around substantially the entire circumference of the tube, and an exit for spent gases from the portion of the interior of the enclosure which is substantially opposite said entrance.

21. In a tube welding machine, the combination with a welding torch which applies heating and fusing flames along a longitudinally extending seam portion of the tube, of a stationary enclosure through which the tube passes, said enclosure having a seamwise-extending slot entrance where the torch delivers its flame, and grooves in its inner surfaces which conduct the envelope gases around substantially the entire circumference of the tube before they are discharged from the enclosure.

22. In a tube welding machine through which tubularly formed material is passed while its seam edges are progressively fused by a stationary welder emitting hot gases, a stationary heating enclosure through which the tube passes at the region of the welder, said enclosure having a seamwise-extending entrance where the flame and gases act upon the seam portion of the tube, and an interior such that the hot gases are trapped and flow therein around substantially the entire circumference of the tube.

23. In a tube welding machine, the combination with a welding torch which applies heating and fusing flames along the seam region of a longitudinally traveling tube, of a stationary enclosure through which the tube passes, said enclosure having a seamwise-extending entrance where the torch delivers its flame and through which air can enter for burning the envelope gases, and means for conducting the burning envelope gases around substantially the entire circumference of the tube.

JAMES L. ANDERSON.